(12) United States Patent
Lee (10) Patent No.: US 6,559,840 B1
(45) Date of Patent: May 6, 2003

(54) PROCESS FOR TRANSFORMING TWO-DIMENSIONAL IMAGES INTO THREE-DIMENSIONAL ILLUSIONS

(76) Inventor: Elaine W. Lee, P.O. Box 582, Seattle, WA (US) 98111-0582

( * ) Notice: Subject to any disclaimer, the term of this patent is extended or adjusted under 35 U.S.C. 154(b) by 0 days.

(21) Appl. No.: 09/496,946

(22) Filed: Feb. 3, 2000

Related U.S. Application Data (60) Provisional application No. 60/119,490, filed on Feb. 10, 1999.

(51) Int. Cl.[7] ................................................ G06T 17/00
(52) U.S. Cl. ......................................... 345/419; 345/31
(58) Field of Search ................................ 345/419, 592, 345/167, 31, 82; 352/98, 86; 353/7; 434/365; 396/336, 330

(56) References Cited

U.S. PATENT DOCUMENTS

| 5,082,350 A | | 1/1992 | Garcia et al. ................ 359/478 |
| 5,678,910 A | * | 10/1997 | Martin .......................... 353/7 |
| 5,745,197 A | | 4/1998 | Leung et al. .................. 349/77 |

* cited by examiner

*Primary Examiner*—Almis R. Jankus
(74) *Attorney, Agent, or Firm*—Townsend Townsend & Crew LLP; Craig P. Wong, Esq.

(57) ABSTRACT

Methods, devices and systems for transforming two-dimensional images into three-dimensional illusions. A plurality of transparent or semi-transparent rods are configured in an annular configuration and mounted to a platform. The rods are rotated by a motor. Using a light source, a two-dimensional image is projected onto the rotating rods to kinetically transform the two-dimensional image into a three-dimensional illusion that seems to move through space.

19 Claims, 7 Drawing Sheets

PROCESS FOR TRANSFORMING TWO-DIMENSIONAL IMAGES INTO THREE-DIMENSIONAL ILLUSIONS

CROSS-REFERENCES TO RELATED APPLICATIONS

This application claims the benefit of priority from (provisional) application no. 60/119,490, filed on Feb. 10, 1999, the full disclosure of which is incorporated herein by reference.

BACKGROUND OF THE INVENTION

Field of Invention

The present invention generally relates to methods and systems for displaying artwork. More particularly, the present invention relates to methods, devices and systems for transforming two-dimensional images into three-dimensional illusions which appear to move through space.

In the visual art world, many artists use traditional methods and processes to make artwork or to express oneself artistically. For example, lithography, a well known form of printed media, utilizes a flat surface treated with grease and water in such a way that ink adheres only to the portions that are to be printed. Another well known art process is photography where an image is recorded by a camera and reproduced on a photosensitive surface.

Although the methods and processes described above are widely used and are established forms of art media, at one point in history they were not considered standard methods. Artists continually create new methods and processes as art mediums. However, the conventional art methods have limits and they are no longer sufficient to carry the voice of modern artistic expression.

The methods and devices for transforming two dimensional images into three dimensional illusions provide an advanced art medium for artistic expression. Several techniques and devices have been developed which display three-dimensional images. Most often, however, the developed techniques and devices are costly and complex. For example, one such method comprises projecting a filtered dual-color two-dimensional image onto a screen or cathode ray tube, then using a special viewing device which has different color filters for the left and right eye. Another such method comprises projecting two simultaneous two-dimensional color images with different polarizations, then using special viewing devices which contains filters with different polarization orientations for the left and right eye. Yet another method comprises alternating the sequence of projections between the left and right images of the stereoscopic pair, then using a special viewing device which shutters each eye synchronously with the projection. All of these techniques attempt to transform a pair of two-dimensional images into a three-dimensional illusion. However, the above mentioned techniques have several disadvantages. Many have a narrow optimum angle for viewing, require the observer to have either special training or special individual viewing equipment to view the three-dimensional illusion.

The conventional technologies do not allow three-dimensional images to be produced simply or inexpensively, nor do they allow the images to be altered quickly. For these reasons, it would be desirable to provide methods and systems which can provide inexpensive and simple ways of transforming two-dimensional images into three-dimensional illusions.

SUMMARY OF THE INVENTION

The present invention includes methods, devices and systems for transforming two-dimensional images into three dimensional illusions that appear to move through space. The present invention generally uses semi-transparent light-reflecting elements as a screen and a kinetic process to transform a projected two-dimensional image into a three dimensional illusion. A projection unit casts a light, typically with a two-dimensional image, onto the moving screen. The moving screen typically comprises a plurality of rods rotating about an axis. The moving screen catches the projected two-dimensional images by reflecting pieces of light and causing a viewer to see a three dimensional illusion which appears to move through space.

In a first aspect, the invention provides a system for transforming two dimensional images into three dimensional illusions. The system includes a projection unit for projecting a two-dimensional image onto a rotating screen. A drive unit rotates an adjustable platform which supports the screen. Typically, the screen includes a plurality of rods. The rods are rotated clockwise or counter-clockwise and optionally the rods can be moved horizontally and/or vertically. The rods may be flat or curved planes 40, hollow cylinders, rectangular in shape, or the like. In a preferred embodiment, the rods are aligned in a parallel configuration and the axis of the rods are aligned substantially perpendicular to the path of the projected two-dimensional image. A control system having a remote control, computer program, mechanical devices, manual devices or any combination thereof, can be used to adjust the speed and position of the rods and/or the projection unit.

In a second aspect, the present invention describes a method for transforming two dimensional images into three dimensional illusions. The method comprises rotating a plurality of rods and projecting an image or images onto the rotating rods. Typically, the rotating rods are mounted on a base and the rods are strategically placed to transform the projected images into a desired three-dimensional illusions.

In a third aspect, the present invention describes a method for creating an artwork. The method includes designing a two dimensional image. A screen is rotated about an axis. The two-dimensional image is projected onto the rotating screen, and a three dimensional illusion is formed.

These and other aspects of the invention will be further evident from the attached drawings and description of the invention.

DESCRIPTION OF THE SPECIFIC EMBODIMENTS

The present invention recites methods, systems and devices for producing three dimensional illusions. More particularly, the present invention transforms projected two-dimensional images into three-dimensional illusions. Preferably the process is used to present artistic musings, but can be used for entertainment, light shows, novelty uses, or the like.

The present invention is most effective in a dimly lit room, such as a bedroom, art studio, night club, café, museums, or the like. Known as "Orbicular Musings," the present invention uses a moving screen to catch pieces of projected light and reflects the light back to a viewer. The moving screen typically has gaps between the portions of the screen. An illusion is created when the viewer's eyes and brain connect the gaps between the portions of the screen to fill in the image to form the three-dimensional illusion. This is generally what is known as persistence of vision or the after-image principle. Enough of the projected image must be captured for the brain and eyes to "see" the three-dimensional illusion volume created by the screen. The images will flicker, move or spin, depending on the rotation speed, the number of rods, rod placement and the image projected.

Figure 1:
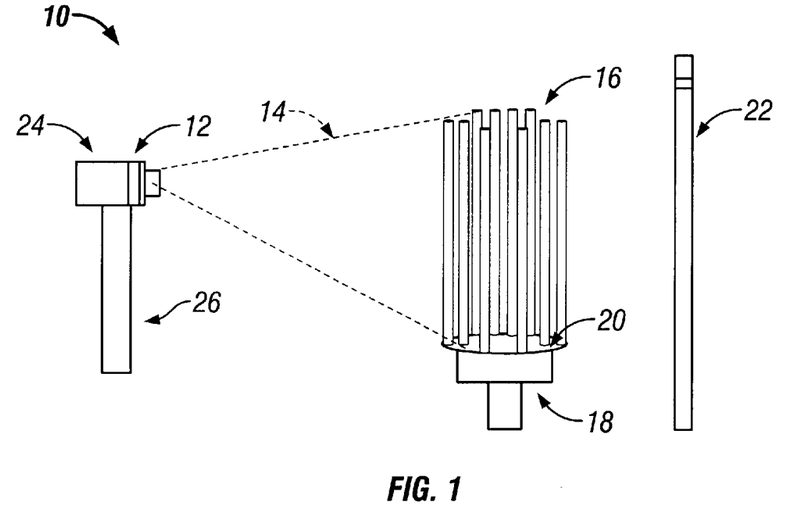
FIG. 1 is a plan view of the system of the present invention.

FIG. 1 illustrates a system 10 incorporating an embodiment of the present invention. The system includes a projection unit 12, a projected two-dimensional image 14, a plurality of screens or rods 16, a drive unit 18, and a platform 20. As shown, a curtain 22 can be placed behind the rotating rods to catch the two-dimensional image 14 as it is projected through the rotating rods. Projection unit 12 can be a slide projector, video projector, a light source, an overhead projector, a laser, or any known device for projecting light or two-dimensional images. Typically, a light source 24 of the projection unit projects the two-dimensional image onto the plurality of rotating rods 16. The two dimensional image 14 can be still pictures, overhead transparencies, motion pictures, directed light, laser beams, or any known type of image which is capable of being projected through light. Typically, the projection unit 12 is placed on an adjustable base 26, such as an adjustable pedestal column or tripod, so that the orientation and height of the projection unit can be altered. If desired, a control system can be coupled to the base to adjust the orientation of the projection unit. Moreover, the projection units can be rotated about the moving screen to further alter the resulting three-dimensional illusion.

Figure 2A:
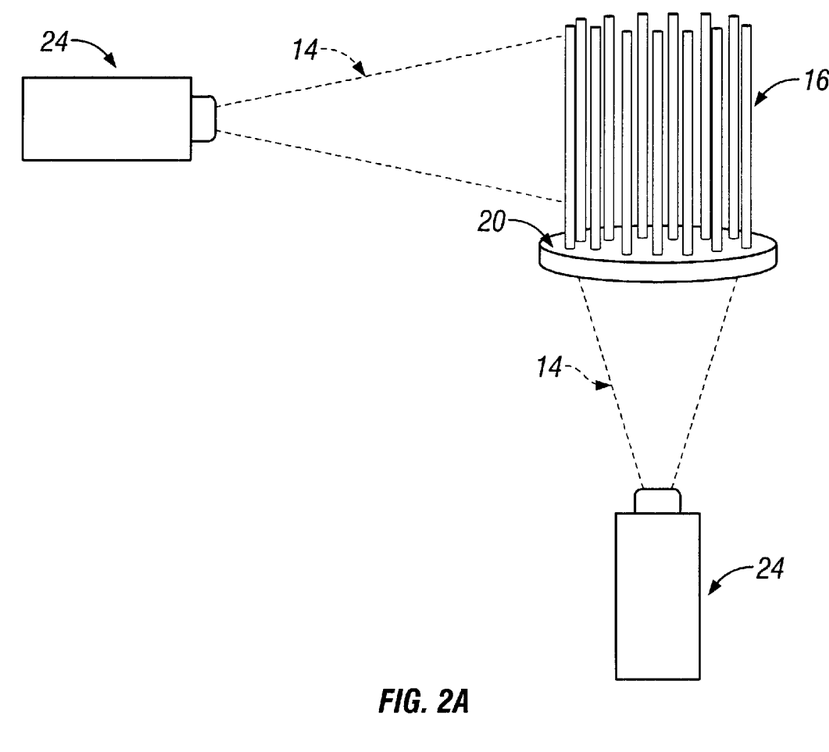
FIGS. 2A and 2B illustrates a system having a plurality of projection units.
Figure 2B:
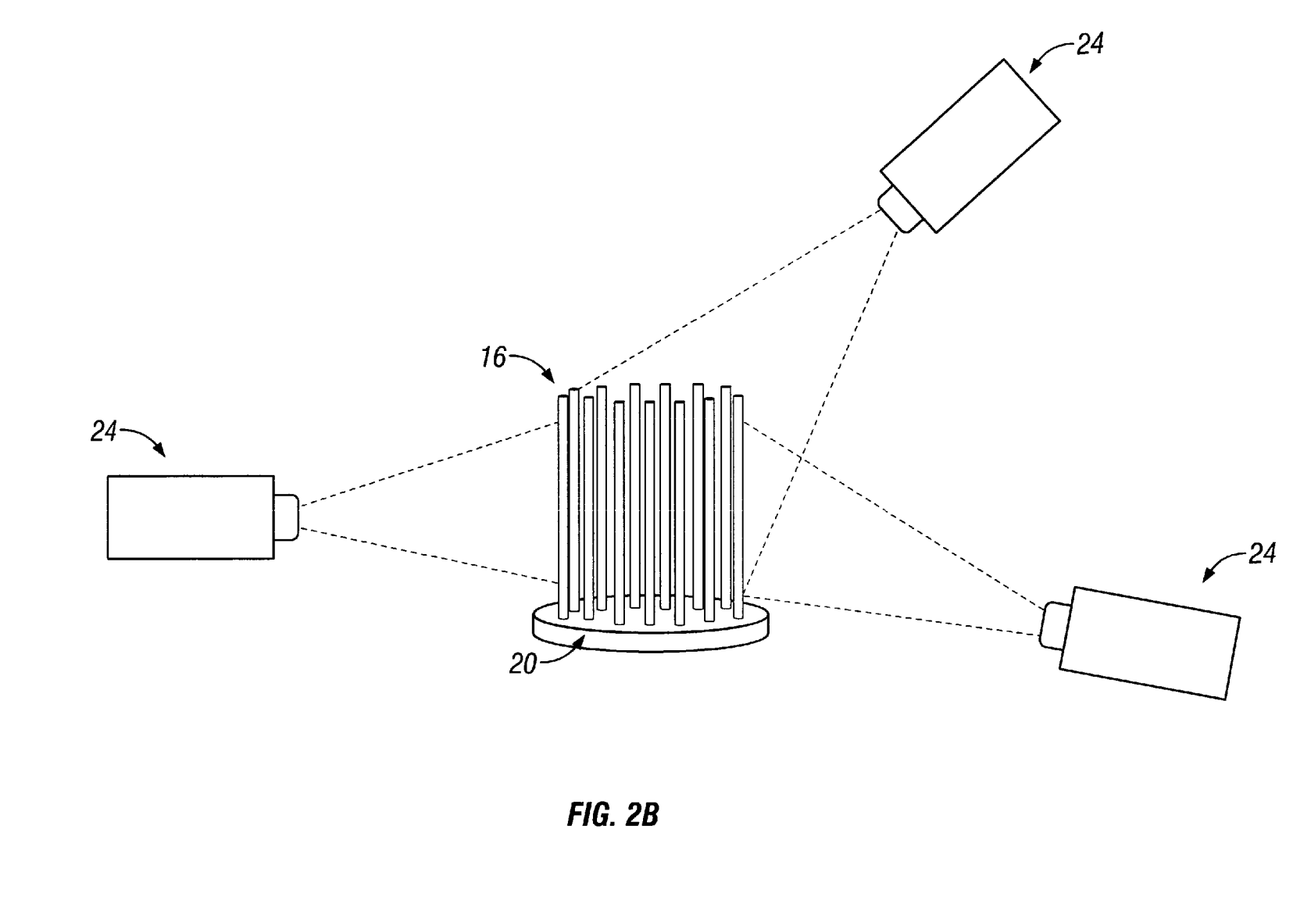

As shown in FIGS. 2A and 2B, a plurality of projection units can be arranged about the rotating screen. In FIG. 2A, two projection units are shown. In FIG. 2B, two projection units are aligned with the moving screen so that the projected two-dimensional images are projected in a path substantially perpendicular to the axis of the rods, while a third projection unit is mounted above the rotating screen. Any number of projection units can be used, with various orientations to project light and/or images onto the moving screen. The projection units can project the images separately, randomly, in a specified order or simultaneously.

The moving screen can be rotated or gyrated by a rotation mechanism. Typically the rotation mechanism is a mechanized motor, a computer system, or the like. Preferably, the rotation mechanism is a gear driven motor which is capable of supporting the rod base platform and the rods 16. Motor 18 preferably has a variable speed control for increasing or decreasing the rotation rate. The rotation rate is typically between 1 rpm and 100 rpm, and preferably between 30 rpm and 45 rpm. If the rods are rotated at a fast rate, the images will appear more detailed. Conversely, if the rods are rotated at a slower rate, the images will flicker slower. If the rods 16 are not rotated by the motor (i.e. 0 rpm), there will be no three-dimensional illusion, as there will be no kinetic effect to form the illusion. The motor is typically powered by a direct current portable battery or by an alternating current, however any power source can be used. The motor will preferably be able to rotate the rods in both a clockwise and counterclockwise orbit. If desired, the motor can be mounted to an adjustable base so that the orientation of the rods can be altered independent of the orientation of the projection unit. Preferably, the motor can be coupled with a control system, remote control, or computer program to alter the speed of rotation, and/or to change the direction of rotation. In some embodiments, a control system and multiple rotating mechanisms are used. For example, an inner portion of the screen can be rotated clockwise by a first rotating mechanism, while an outer portion of the screen can be rotated counter-clockwise by a second rotating mechanism. Any number of rotating mechanisms can be used.

The present invention includes at least one moving screen. However, it is contemplated that a plurality of screens can be used with any number of projection units. The screens are typically comprised of a plurality of rods. However, it is contemplated that flat planes, curved planes, paper, string, mirrors, moving water, moving gases, or any material that is able to move and reflect light can be used. The only requirement of the screen is that it have some physical movement or rotation.

Figure 3A:
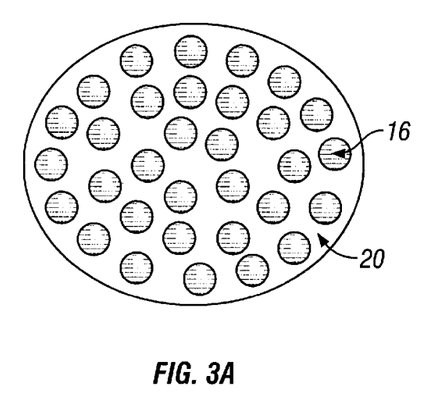
FIGS. 3A–3D is a top-view of a screen having a plurality of rods in various configurations.
Figure 3B:
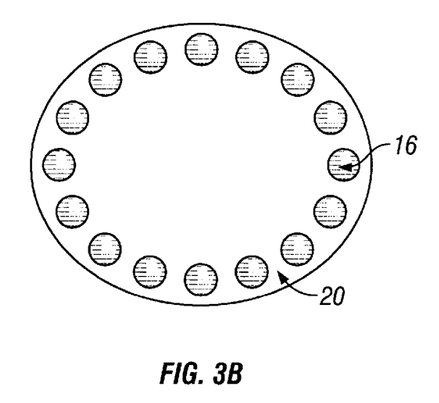
Figure 3C:
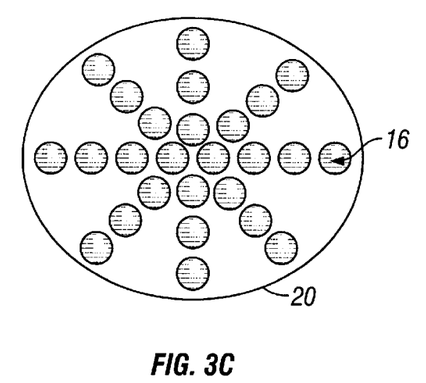
Figure 3D:
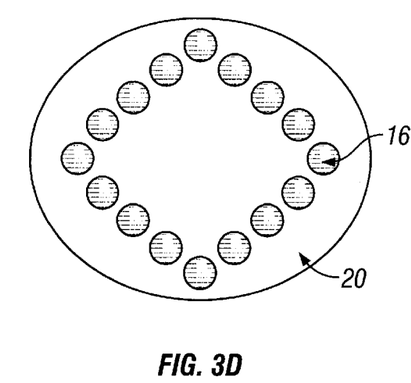

As shown in FIG. 3A, the rods are typically layered in a circular pattern throughout the platform. However, various configurations are contemplated. For example as illustrated in FIGS. 3B–3D the rods can be configured orderly, in an annular pattern or random patterns or configurations. As the configuration changes, the three-dimensional illusion is changed and/or distorted.

The longitudinal axis of the screen (i.e. rods) are preferably mounted normal to the platform. Moreover, the axis are generally aligned substantially perpendicular to the path of the projected two-dimensional image 14. As described above, the projection unit can be higher or lower relative to the rotating screen. Thus, in some embodiments the path of the projected image will not be perpendicular to the axis of the rods. The path of projected image will generally not vary by more than 30° from the perpendicular alignment.

The size of the screen is dictated by the size of the desired three-dimensional illusion. The rods will extend far enough to capture the image projected. For embodiments which desire a large three-dimensional image, such as a display in a building lobby, the projection unit will typically be placed farther away and the corresponding rods will be large enough to capture the projected image. In contrast, for a desk top system, a smaller three-dimensional illusion is desired and the projection unit will typically be placed closer to the rotating rods. Thus, the corresponding rods will be smaller.

Figure 4A:
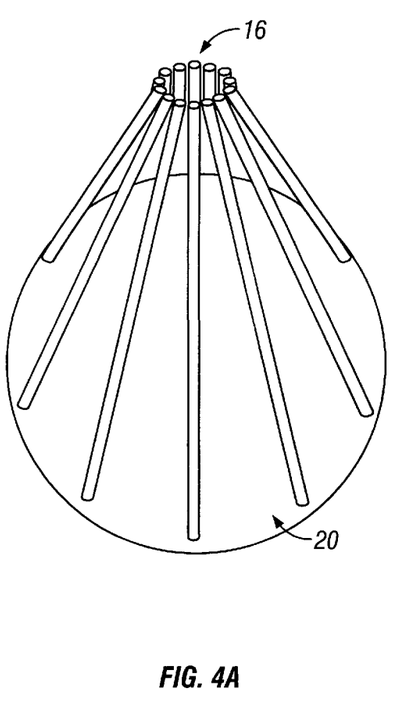
FIGS. 4A–4D illustrate various rod and plane configurations.
Figure 4B:
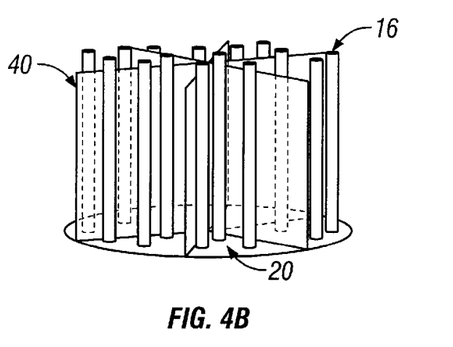
Figure 4C:
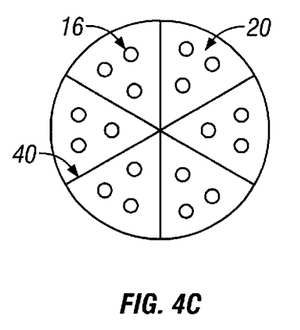
Figure 4D:
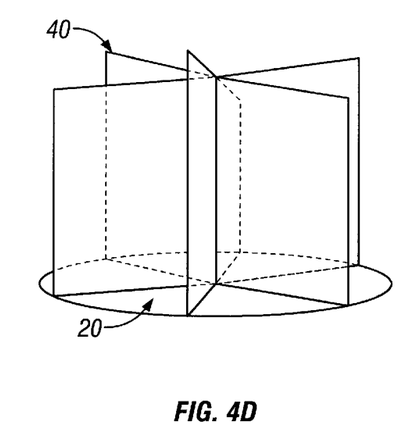

As shown in FIG. 4A–4D, the rods can be aligned in a various configurations. FIG. 4A illustrates a non-parallel configuration. Although the screen is shown only in a tee-pee shape, various non-parallel configurations can be used. FIGS. 4B and 4C illustrate an embodiment having a rod and plane configuration, in which intersecting planes are dispersed amongst the parallel rods. FIG. 4D illustrates an embodiment having only planes. Depending on the desired effect, the rods or planes can be aligned closer or farther apart. As the parameters of the rods and planes change (spacing and configuration), the resulting three-dimensional image will change. Generally, as the rods are spaced farther apart, the resulting three-dimensional illusion will flicker more and will be less detailed.

Figure 5A:
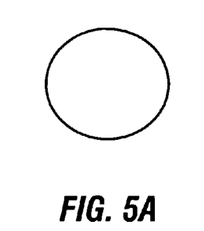
FIGS. 5A–5E and 5G illustrate top views of various rod and screen cross-sections.
Figure 5B:
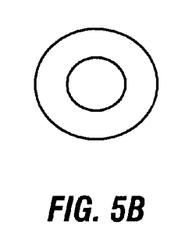
Figure 5C:
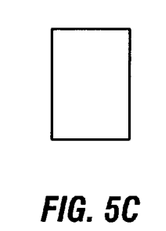
Figure 5D:
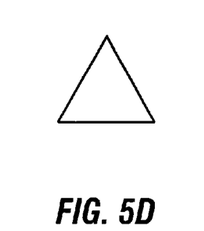
Figure 5E:
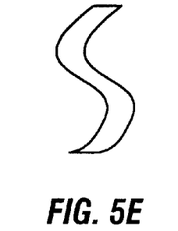
Figure 5F:
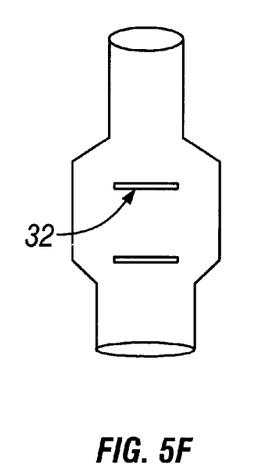
FIG. 5F is a perspective view of an alternative rod having slits.
Figure 5G:
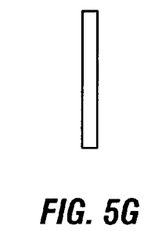

The rods 16 are generally composed of a transparent or semi-transparent material. Typically, the rods are comprised of altered acrylic, glass, wire mesh or the like. Generally, the rods are clear, but may alternatively be colored. As illustrated in FIG. 5A, the rods generally have a solid circular cross section, but as shown in FIGS. 5B–5G, the rods can have any cross-section. Some embodiments are hollow, rectangular shaped, triangular shaped, curved planes, straight planes or the like. As illustrated in FIG. 5F, to further distort the projected image, the rods may have slits 32 or bulges in the material. As noted above, the three dimensional image detail will change when the shape or material of the rods is altered.

Preferably the rods are coated with a layer of paint and gloss. The paint layer stops the light from going through the rods and brighten the colors of the captured image. Typically, the paint coat is white, but the paint coat can be of any color desired. The gloss coat provides reflection, and makes the image sharper and more detailed. Application of the paint coat and gloss can cover between 1% to 100% of a rod or screen, depending on the effect desired. In a preferred embodiment, 25% of the rod is covered with paint and 100% of the rod is covered with gloss.

To improve the artistic qualities of the screen, some embodiments of the present invention have screens or rods which are lit. A light source can be placed at either end of the rod or screen, so that light is directed along the axis.

Figure 6A:
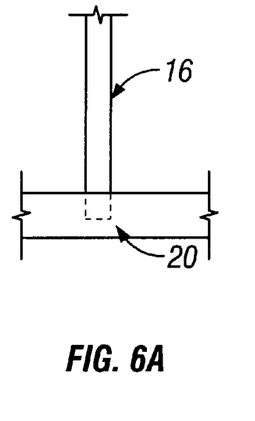
FIGS. 6A–6H are plan views of various platform configurations for supporting the rod structures.
Figure 6B:
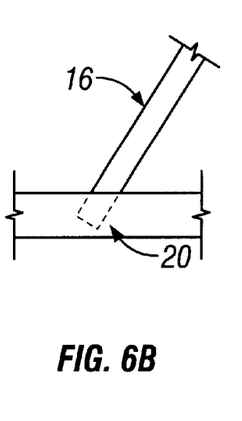
Figure 6C:
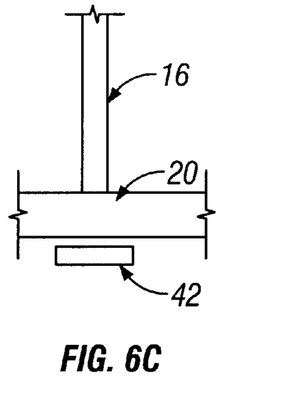
Figure 6D:
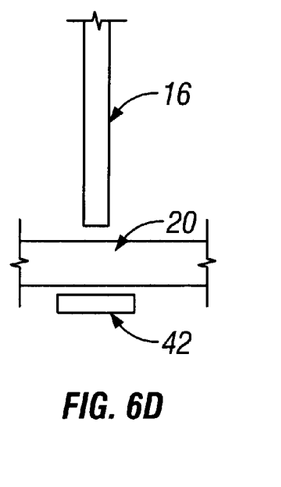
Figure 6E:
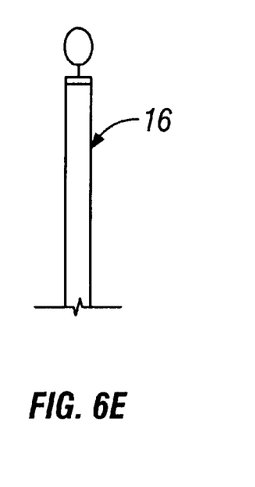
Figure 6F:
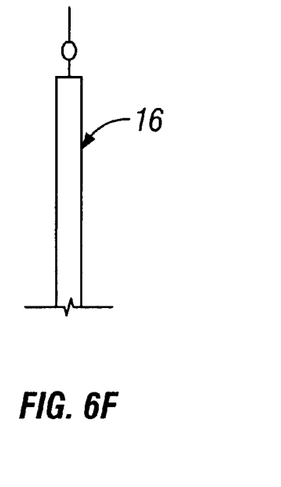
Figure 6G:
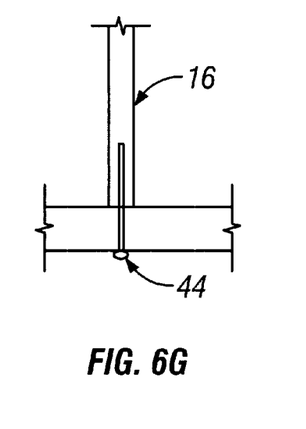

The screen is typically mounted to a platform which is coupled to the rotating mechanism. The platform is generally composed of a material capable of supporting the screen. Typically, the platform is composed of wood, but alternatively may be composed of plaster, plastic, metal, or any material capable of supporting the screen. In some embodiments, holes 26 are placed in the platform in strategic areas on the platform. As shown in FIG. 6A–6G, using known methods, various methods can be used to support the rods in a parallel or non-parallel configuration. The platforms can be removable from the motor 22, so that the configuration of the rods can be easily changed from one configuration to another. As shown in FIGS. 6C and 6D, magnets 42 can be used to mount the rods to the platform. Magnets can be mounted to the bottom of the rods while a corresponding magnet is mounted beneath the platform to couple the rod to the platform. It is contemplated that the rods can be levitated by strategically placing magnets of the same polarity to the platform and rods.

In some embodiments, the platform can be inverted and the rods can hang down from the platform. The rods can be fixedly attached through mounting by screws 44 or through the use of holes (as described above), or can merely be hung down using known methods, such as rotatably attaching, gluing, tying, or the like.

Figure 6H:
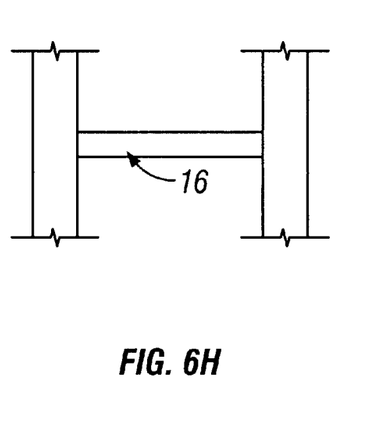

FIG. 6H illustrates an alternative screen embodiment. The rods can be mounted in a plane parallel to the platform by attaching support arms 50 perpendicular to the platform 18 and aligning the rods between the platform.

It should be noted that a platform is not required for the present invention to function. The screen can be mounted directly to the rotating mechanism. For example, the rods can be mounted directly onto the water wheel or gear and rotated.

In an exemplary embodiment, the present invention sets forth a display system for a building lobby. A plurality of projection units can be used and music can be played. Typically, a control system is used to synchronize the three-dimensional illusions to an audio soundtrack. Moreover, the control system can control the projection units so that the two-dimensional images are projected in a specific order.

In another exemplary embodiment, the present invention sets for a desktop system for entertainment purposes. A user can create their own three-dimensional images by customizing the two-dimensional image used. Typically, a small light source is mounted a specified distance away from the moving screen. In some embodiments the light source is coupled to the rotating screen. The user simply places the two-dimensional image into the path of the light to transform the two-dimensional image into a three-dimensional illusion. If the user desires to change the image, the user simply creates another two-dimensional image and replaces the first two-dimensional image.

In use, the projection unit 12 is positioned a desired distance away from the rotating rods 12. (FIG. 1). A configuration for the screen is chosen. Typically, rods 16 are mounted on the platform 20 or are hung from the platform, and the platform is coupled to the drive unit 18. Depending on the effect desired, an initial speed of gyration or rotation for the rods is chosen. In some embodiments, the control system can vary the speed and direction of rotation during the projection of the two-dimensional images to alter or distort the resulting three-dimensional illusion. After the rods 16 have begun rotating or gyrating, the light projector 12 is turned on, and the two-dimensional image 14 is introduced into the path of the projected light. The rotating rods become a screen for the projected two-dimensional image. As the two-dimensional image hits the rotating rods, pieces of light catch the rotating rods 16 and the two-dimensional image appears to transform into a three-dimensional illusion, which appears to move through space.

Figure 7:
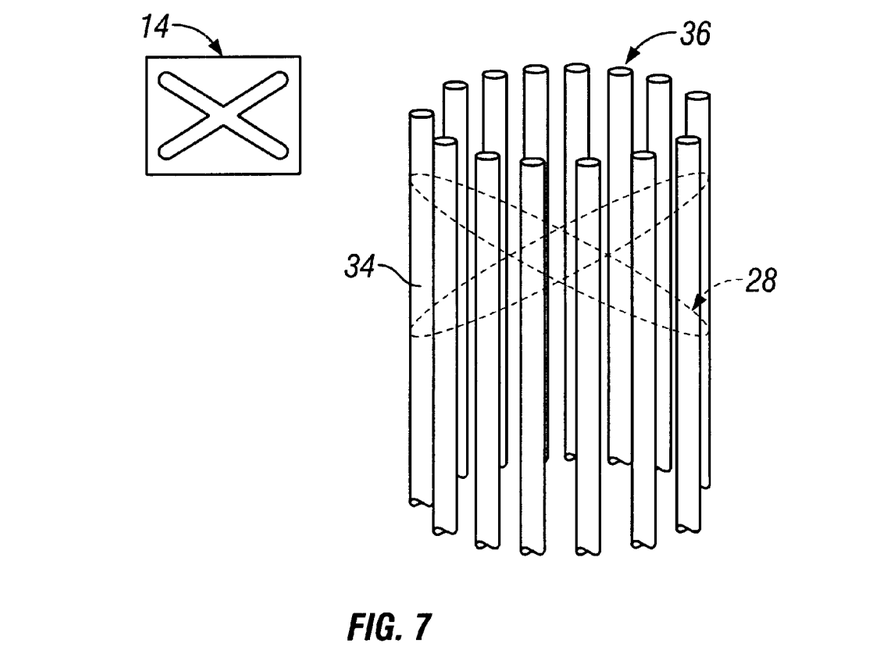
FIG. 7 illustrates a sample two-dimensional image and a resulting three-dimensional illusion.

A typical two-dimensional image and resulting three-dimensional illusion is illustrated in FIG. 7. The two-dimensional image is a simple "X". The two-dimensional image is put into a path of light and projected through a standard slide projector onto the rotating rods. The rods are configured throughout the platform. Some of the projected image hits the front rods 34, while some of the image passes through the spacing and reflects off the back rods 36. The two-dimensional "X" is transformed into a three-dimensional illusion. Because the rods rotate and catch only pieces of the two-dimensional image, the resulting three-dimensional illusion appears to be rotating rings.

Figure 8:
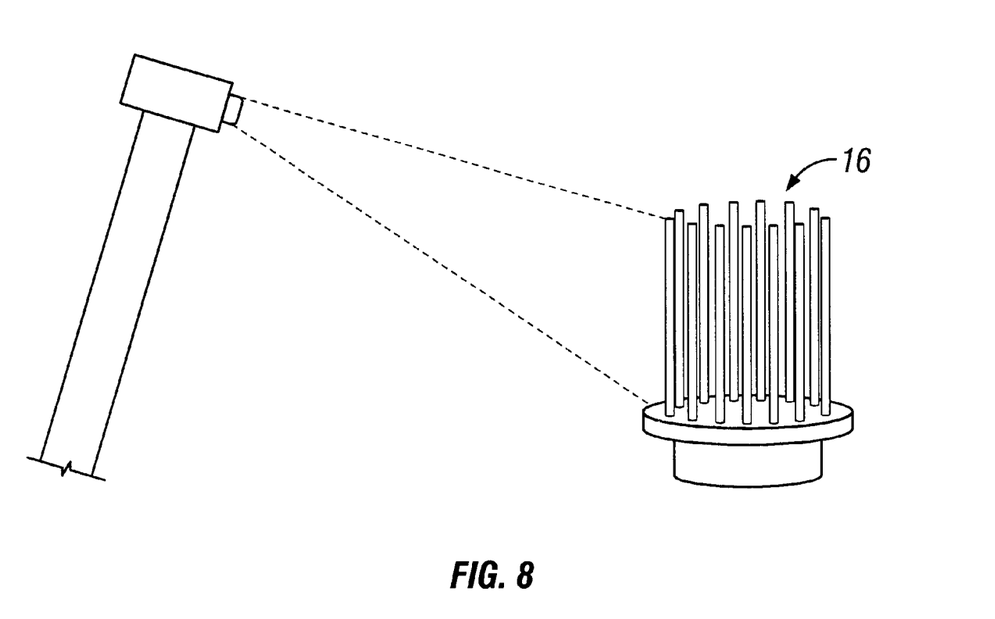
FIG. 8 illustrates a system where the projection unit is higher than the rod assembly.

To provide an undistorted three-dimensional image 28, the rotating rods and projection unit are positioned at the same height, and the rods are positioned normal to the path of the projected images. However, if a distorted three-dimensional image is desired, the configuration of the rods can be changed. The height or orientation of the motor, platform, rods, or projection unit can be changed. For example, as shown in FIG. 8, the height of the projection unit 12 can be adjusted so that the projection unit is higher than the rod assembly 16. By merely changing the angle of incidence, the light will hit the rods at a different angle, thus causing a distorted three dimensional image. By having a mechanized or computer-controlled height adjuster, the resulting three-dimensional illusion can be altered quickly and easily. For example, a three-dimensional image can be altered by moving the projection unit vertically, horizontally or by rotating the projection unit around the rotating screen.

While the exemplary embodiments have been described in some detail, by way of example and for clarity of understanding, a variety of modifications, adaptations, and changes will be obvious to those who are skilled in the art. Therefore, the scope of the present invention is limited solely by the appended claims.

What is claimed is:

1. A method for transforming two dimensional images into three dimensional illusions, the method comprising:

mounting a plurality of rods to a base;

rotating the base about an axis; and projecting a two dimensional image onto the rotating rods to catch pieces of the projected two-dimensional images with the rods, wherein the resulting image on the rotating rods is a three-dimensional illusion.

2. The method of claim 1, further comprising aligning a longitudinal axis of the rods parallel to the axis.

3. The method of claim 1, comprising aligning a longitudinal axis of rods substantially perpendicular to a path of a projected two-dimensional image.

4. The method of claim 3, wherein the plurality of rods are aligned in a random configuration.

5. The method of claim 1, wherein the projecting step is carried out with a light source.

6. The method of claim 1, comprising the step of adjusting the height of at least one of the rods and light source.

7. The method of claim 1, wherein the projecting step is carried out by using a slide projector.

8. The method of claim 1, wherein the projecting step is carried out by a movie projector.

9. A method as recited in claim 1, further comprising distorting the three-dimensional image by altering the configuration of either the rod configuration or the orientation of a projection unit.

10. The method of claim 1 wherein the rotating step of the rods is carried out by rotating the rods between 1 rpm and 100 rpm.

11. A method of creating three dimensional illusions using a plurality of screens, the method comprising:

rotating the screens around an axis in a first direction, wherein the screens define a plurality of spaced apart screen surfaces;

projecting a two-dimensional image onto the plurality of spaced screen surfaces; and kinetically transforming the two-dimensional image into a three dimensional illusion.

12. The method as claimed in claim 11 further comprising rotating a portion of the screen in a second direction, opposite of the first direction.

13. A system for transforming two dimensional images into three dimensional illusions, the system comprising:

a plurality of rotating screens, wherein the rotating screens define a plurality of spaced apart screen surfaces; and a projection device, wherein the projection device projects light and a two-dimensional image onto the rotating screens to create a three-dimensional image.

14. The system of claim 13 wherein the plurality of screens comprise planes.

15. The system of claim 17 wherein the plurality of planes intersect.

16. The system of claim 13 wherein the projection device comprises a slide projector, a video projector, an overhead projector, or a laser.

17. The system of claim 13 wherein the rotating screen is covered with at least one of a paint and a gloss.

18. The system of claim 13 wherein the screen comprises a semi-transparent or transparent material.

19. A system for transforming two dimensional images into three dimensional illusions, the system comprising:

a plurality of rotating screens, wherein the screens comprise a plurality of spaced elongate members; and a projection device, wherein the projection device projects light and a two-dimensional image onto the rotating screens to create a three-dimensional image.

* * * * *